(12) United States Patent
Guo et al.

(10) Patent No.: US 9,541,448 B2
(45) Date of Patent: Jan. 10, 2017

(54) SILICON PHOTOMULTIPLIERS WITH DIGITIZED MICRO-CELLS HAVING A FIRST ONE-SHOT PULSE AND A SECOND ONE-SHOT PULSE PROVIDED BY AN ELECTRONIC CIRCUIT

(71) Applicant: General Electric Company, Schenectady, NY (US)

(72) Inventors: Jianjun Guo, Ballston Spa, NY (US); Sergei Ivanovich Dolinsky, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 155 days.

(21) Appl. No.: 14/615,806

(22) Filed: Feb. 6, 2015

(65) Prior Publication Data

US 2016/0231168 A1   Aug. 11, 2016

(51) Int. Cl.
*G01J 1/42* (2006.01)
*G01J 1/44* (2006.01)

(52) U.S. Cl.
CPC ............. *G01J 1/4228* (2013.01); *G01J 1/44* (2013.01); *G01J 2001/4466* (2013.01)

(58) Field of Classification Search
CPC ........ G01J 1/44; G01J 1/42; G01J 2001/4466; G01J 2001/442
USPC ........ 250/214 R, 207, 208.1, 214 PR, 214.1; 356/317, 318, 326, 432, 445, 368; 327/514, 515; 313/103 R, 10 CM, 528
See application file for complete search history.

(56) References Cited

U.S. PATENT DOCUMENTS

| | | | |
|---|---|---|---|
| 6,501,539 B2 * | 12/2002 | Chien | ............... G01S 7/484 356/5.01 |
| 2013/0009063 A1 | 1/2013 | Henseler et al. | |
| 2013/0009067 A1 | 1/2013 | Schmand et al. | |
| 2013/0099100 A1 | 4/2013 | Pavlov et al. | |
| 2013/0313414 A1 | 11/2013 | Pavlov et al. | |

FOREIGN PATENT DOCUMENTS

CN          102735350 A      10/2012

OTHER PUBLICATIONS

Seifert et al., "Simulation of Silicon Photomultiplier Signals", IEEE Transactions on Nuclear Science, vol. 56, Issue 6, pp. 3726-3733, Dec. 8, 2009.

(Continued)

*Primary Examiner* — Que T Le
(74) *Attorney, Agent, or Firm* — Melissa K. Dobson

(57) ABSTRACT

A silicon photomultiplier array of microcells including a photon avalanche diode and an electronic circuit configured to provide a first one-shot pulse and a second one-shot pulse based on a detected current flowing through the photon avalanche diode. The microcells arranged in rows and columns with each microcell of a respective row connected to a respective row data bus connected to a row counter configured to count one or more first one-shot pulses for a predetermined time period, a pixel adder configured to sum the count, and a digital-to-analog converter connected to the pixel adder to convert sum to an analog signal representative of an energy readout. A timing logic circuit configured to provide a validation signal to a counter control logic circuit, and the counter control logic circuit configured to provide one of a start signal, a stop signal, and a reset signal to the row counter.

20 Claims, 5 Drawing Sheets

(56) References Cited

OTHER PUBLICATIONS

Ronzhin et al., "Study of timing properties of SiPMs at Fermilab", Nuclear Science Symposium and Medical Imaging Conference (NSS/MIC), 2012 IEEE, pp. 245-249, Oct. 27, 2012-Nov. 3, 2012.
Preston et al., "Neutron generator burst timing measured using a pulse shape discrimination plastic scintillator with silicon photo-multiplier readout", Journal of Instrumentation, vol. 8, Dec. 2013.
Martin-Chassard et al., "FLC-SIPM: Front-End Chip for SIPM Readout for ILC Analog HCAL", 2005 International Linear Collider Workshop—Stanford, U.S.A., Jan. 5, 2007.

\* cited by examiner

US 9,541,448 B2

SILICON PHOTOMULTIPLIERS WITH DIGITIZED MICRO-CELLS HAVING A FIRST ONE-SHOT PULSE AND A SECOND ONE-SHOT PULSE PROVIDED BY AN ELECTRONIC CIRCUIT

BACKGROUND

Two conventional approaches to implement photon sensors based on an array of single photon avalanche diodes (SPAD) operated in Geiger mode include analog silicon photo multipliers (SiPM), and digital silicon photomultipliers (dSiPM), also known as digital photon counters.

In conventional SiPM devices each individual SPAD is connected to a readout network via a quenching resistor having typical values between 100 KOhm-1 MOhm. A detected photon generates an avalanche, the SPAD capacitance discharges to a breakdown voltage and the recharging current creates a signal. Typical pulse shape of single photo electron (SPE) signal has a fast rise time, following a long fall time. As a result, pulse shape of a nuclear detector signal has a slow rise time (about a few tens of nanoseconds). These pulse shape characteristics make it difficult to achieve good time resolution.

Conventional dSiPM devices incorporate special electronic circuitry for each SPAD produced on the same silicon wafer. This circuitry is designed to detect avalanche and actively quench the SPAD. Each circuitry has a memory element (one to a few bits). A special network tree is used to collect time stamps from all the SPADs. A special read out cycle has to be executed to obtain information on the number of photons detected per event. This read out cycle requires a special digital controller for each dSiPM.

A SiPM pixel can include thousands of micro-cells. These micro-cells are conventionally arranged as an array. For analog SiPM pixels, the micro-cells in the pixel can be wire-summed together to output a signal in an analog fashion. Unlike the analog SiPM, a dSiPM pixel can include built-in electronics for each micro-cell.

FIG. 1 depicts a block diagram of conventional digital photon counter 100 that uses multiple dSiPM pixels 110. To read out timing, dSiPMs can include a complicated trigger network and an on-chip time-to-digital converter (TDC) fabricated on the same wafer. To read out energy, the dSiPM uses counter 130 connected to line 120 to scan the microcell array and count the number of firing microcells. The counter then outputs the final count accumulated during a predetermined time period to controller 150 as its digitized energy reading. The controller can be a field programmable gate array (FPGA). The counter and external controller can be connected by data bus 140.

DESCRIPTION

In accordance with embodiments, hybrid SiPM (HSiPM) technology can be used to detect photons. Embodiments implementing HSiPM technology take advantage of both the photon counting capability of each micro-cell, and the simplicity of analog SiPM. In HSiPM, each micro-cell has built-in active electronics. A firing micro-cell generates a predefined digital pulse. The digital pulses from all the firing micro-cells are summed in an analog fashion, and output to external electronics for timing and energy readout.

Because the micro-cells in both HSiPM and dSiPM generate a digital pulse for every detected photon, this information can be used for energy readout, instead of read out all digital pulses individually.

In accordance with embodiments, a small electronic circuitry is created during SiPM fabrication for each SPAD. This circuitry detects the avalanche development and generates a long (about 10 to 1000 ns) and a short (about 1.0 nsec) pulses in two (one-shot) readout networks. The short one-shot network is used for obtaining timing measurements, and the long one-shot is used for obtaining energy measurements.

In accordance with embodiments, the predefined digital pulse generated by the HSiPM micro-cells can be used for energy readout information instead of read out all digital pulses individually. The long one-shot network is equivalent to box integration. The duration of the long pulse shape can be programmably controlled. Because one SPAD will produce only one one-shot per detected photon independently from after-pulses, controlling the pulse duration can prevent after-pulses to be counted in the energy measurement. This active sensing method results in stable gain, low excess noise factors, and potentially higher photo detection efficiency (PDE).

In accordance with some embodiments, the number of digital pulses generated in the pixel is counted and then converted to an analog value through a digital-to-analog converter (DAC). The analog value is provided to backend electronics for further processing. Embodying devices avoid the complexity of the high speed digital I/O required by dSiPM. The power consumption of embodying device is reduced compared to that demanded by high-speed digital readouts, and the troublesome crosstalk caused by the high speed digital clock needed in dSiPM is eliminated.

Figure 1:
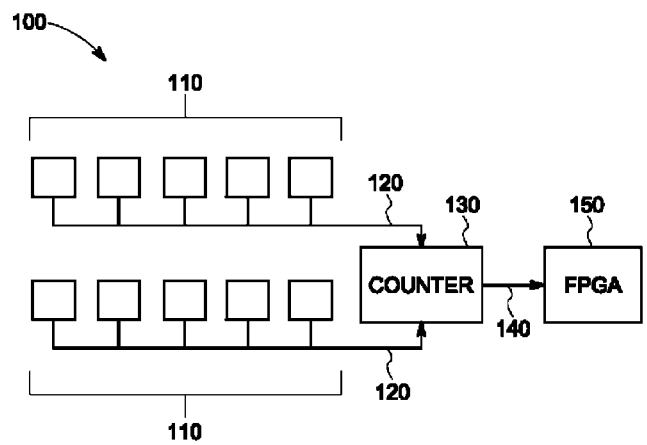
FIG. 1 depicts a block diagram of a conventional digital photon counter.
Figure 2:
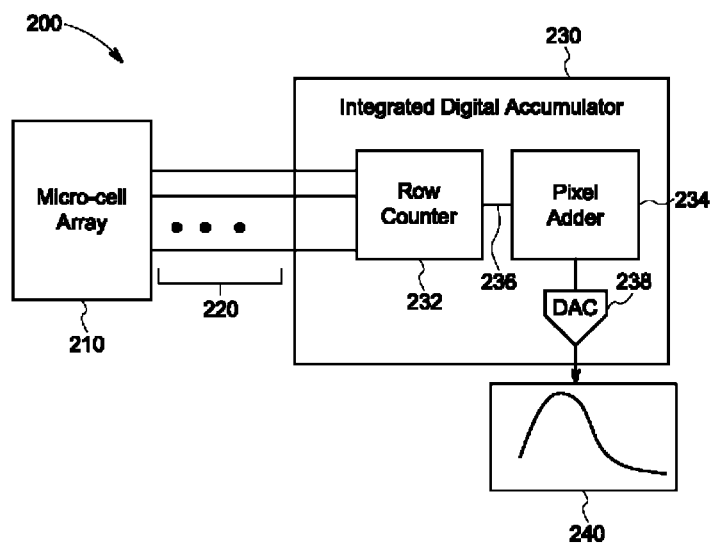
FIG. 2 depicts a block diagram of a detector in accordance with some embodiments.

FIG. 2 depicts a block diagram of detector 200 in accordance with some embodiments. Detector 200 includes micro-cell array 210 that is a grouping of individual micro-cells. If one of the micro-cells fires, the electronic circuitry created inside the micro-cell generates a one-shot pulse, and a memory element, a latch for example, is set. The memory elements of the micro-cells in one row are daisy-chained along respective row data buses 220 to row counter 232 within integrated digital accumulator 230. The memory element can be reset or cleared either synchronously or asynchronously.

The row counter sums the number of one-shot pulses generated by the micro-cells in a row of micro-cell array 210 for a predetermined time period. In one implementation the row counter can include counters and storage memory for each row of the micro-cell array.

At the conclusion of the predetermined time period, the count stored for each row is provided to pixel adder 234 which is coupled to the counter through data bus 236. In one implementation, the counter and pixel adder can be integrated in one element. Pixel adder 234 sums the values of the row counters' memory stores. The pixel adder drives DAC 238, which converts the digital content provided by pixel adder 234 into analog signal 240 for energy readout. Because embodying device do not require high-speed logic, and their fast clocks, cross talk from the high speed clock is avoided which greatly simplifies the I/O for SiPM devices.

Figure 3:
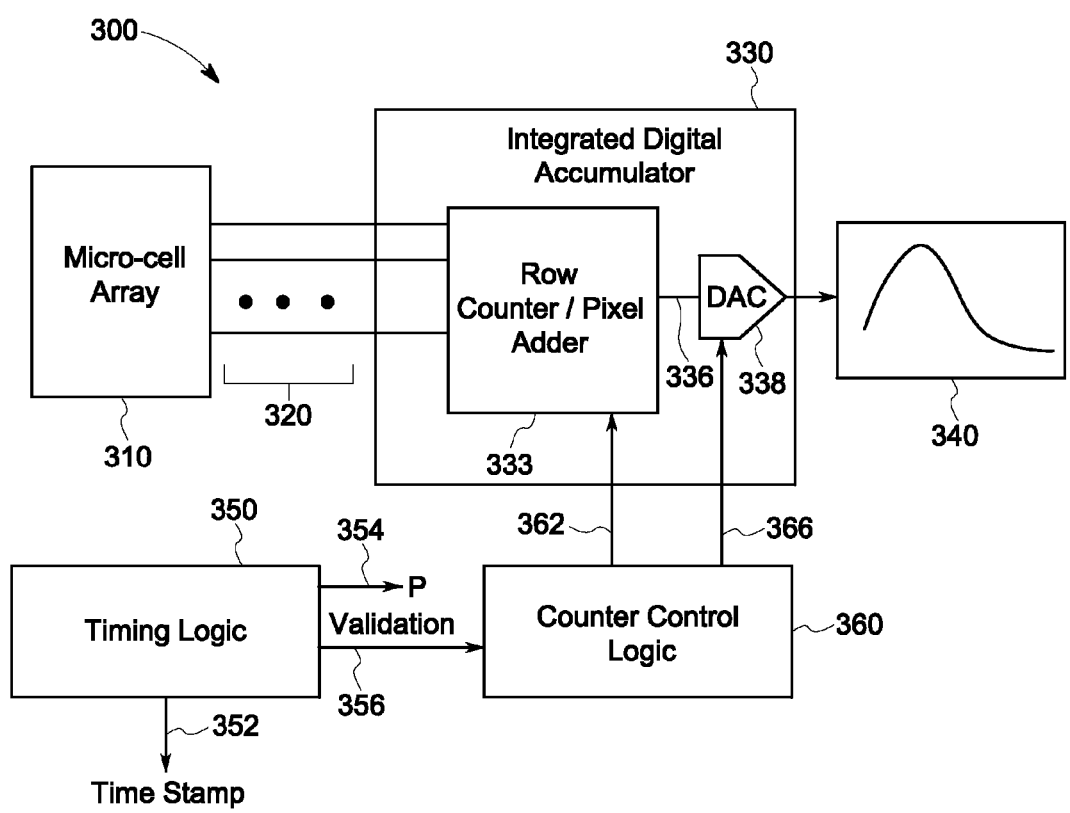
FIG. 3 depicts a block diagram of a detector in accordance with some embodiments.

FIG. 3 depicts a block diagram of detector 300 in accordance with some embodiments. Detector 300 includes micro-cell array 310, which is connected to integrated digital accumulator 330 by respective row data buses 320. In the embodiment depicted in FIG. 3, one unit implements row counter/pixel adder 333. However, as disclosed above, in other implementations the row counter and pixel adder can be implemented separately.

Detector 300 includes timing logic 350 which provides validation signal 356 to counter control logic 360. Timing logic 350 also provides output line 354 as a primary trigger to the trigger network to get the timing information. As disclosed above, the memory elements of the micro-cells are read out as the counter value. In this embodiment, validation signal 356 is provided from the timing logic to the counter control logic as the signal to start, stop, and/or reset the row counter. The validation signal 356 also gates the trigger signal to the TDC for timing pickup.

In accordance with one implementation, row counter can always be counting the micro-cell signals. Counter control logic 360 can monitor the counter output, and compare the count against a predetermined threshold in digital code. If the count exceeds the predetermined threshold, and validation signal 356 has not been received from timing logic 350, the counter control logic can reset the counter. If a validation signal has been provided, the counter control logic can reset the counter after a pre-determined integration time period (e.g., perhaps 200 nsec or some other period).

Validation signal 356 from the timing logic starts the counter to count, and resets the counter after a predetermined integration time. In accordance with one implementation, the counter is sensitive to the falling edge of the one-shot pulses from the micro-cells.

In another implementation, the row counter can be periodically reset. This periodic reset can be based on a predetermined time period. The periodic reset can be logically combined in an OR function with the validation signal from the timing logic. In yet another implementation, the row counter need not have a reset requirement. The pixel adder can apply a built-in band pass filter to the energy analog output signal to eliminate the slow drift due to dark counts, etc. In one implementation, the bandwidth of the band pass filter can be a programmable.

Figure 4:
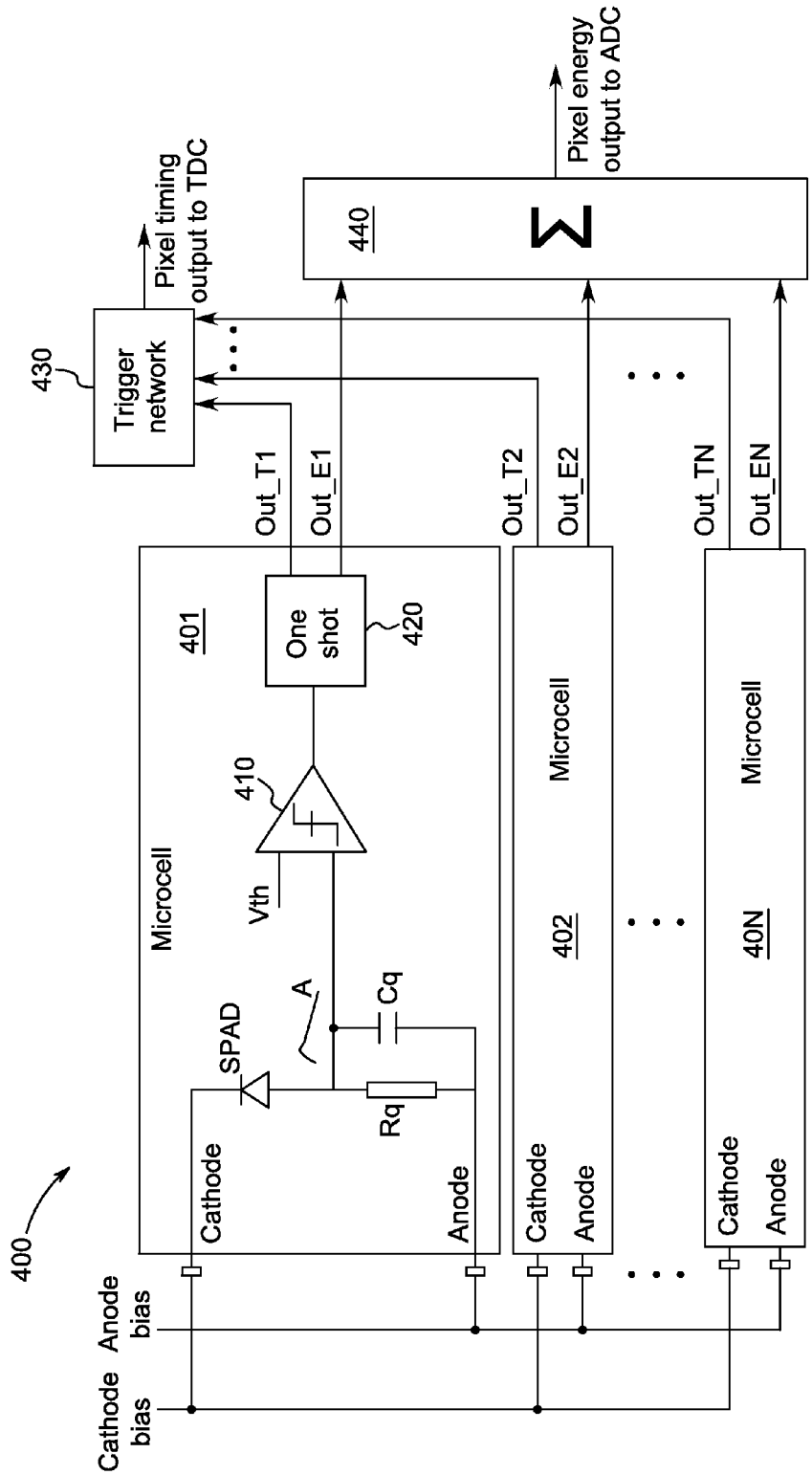
FIG. 4 depicts a microcell array with signal processing network in accordance with some embodiments.

FIG. 4 depicts pixel microcell array 400 with a signal processing network in accordance with some embodiments. The microcell array includes microcells 401, 402, . . . , 40N. Each microcell includes comparator 410 that compares a detected photon level from an SPAD with a threshold voltage Vth.

The microcell model includes a diode capacitor Cd associated with the SPAD. Quench circuitry in the depicted example includes a quench resistor Rq and a parasitic quench capacitor Cq. The SPAD, operating in Geiger mode, develops current pulse A.

In accordance with embodiments, comparator 410 can operate in voltage threshold mode. In other implementations, comparator 410 can be configured as a current comparator and sense the SPAD activity in a current mode. Each microcell includes one-shot circuit 420 that forms a pulse output based on an input from comparator 410. In accordance with embodiments, one-shot circuit 420 provides two pulse outputs—a time output pulse Out_T which is provided to trigger network 430, and an energy output pulse Out_E which is provided to summer 440.

Trigger network 430 provides a pixel timing output pulse to a time-to-digital converter (TDC). The time output pulse Out_T can have a short duration and low jitter. Summer 440 can be implemented as a summing node (e.g., wire summing) or as a summer (e.g., integrated or discrete circuitry). The energy output pulse Out_E can have a long duration representative of the integration time for energy measurements of detector 400. The summer can provide an output representative of the array's detected energy to an analog-to-digital converter.

Figure 5:
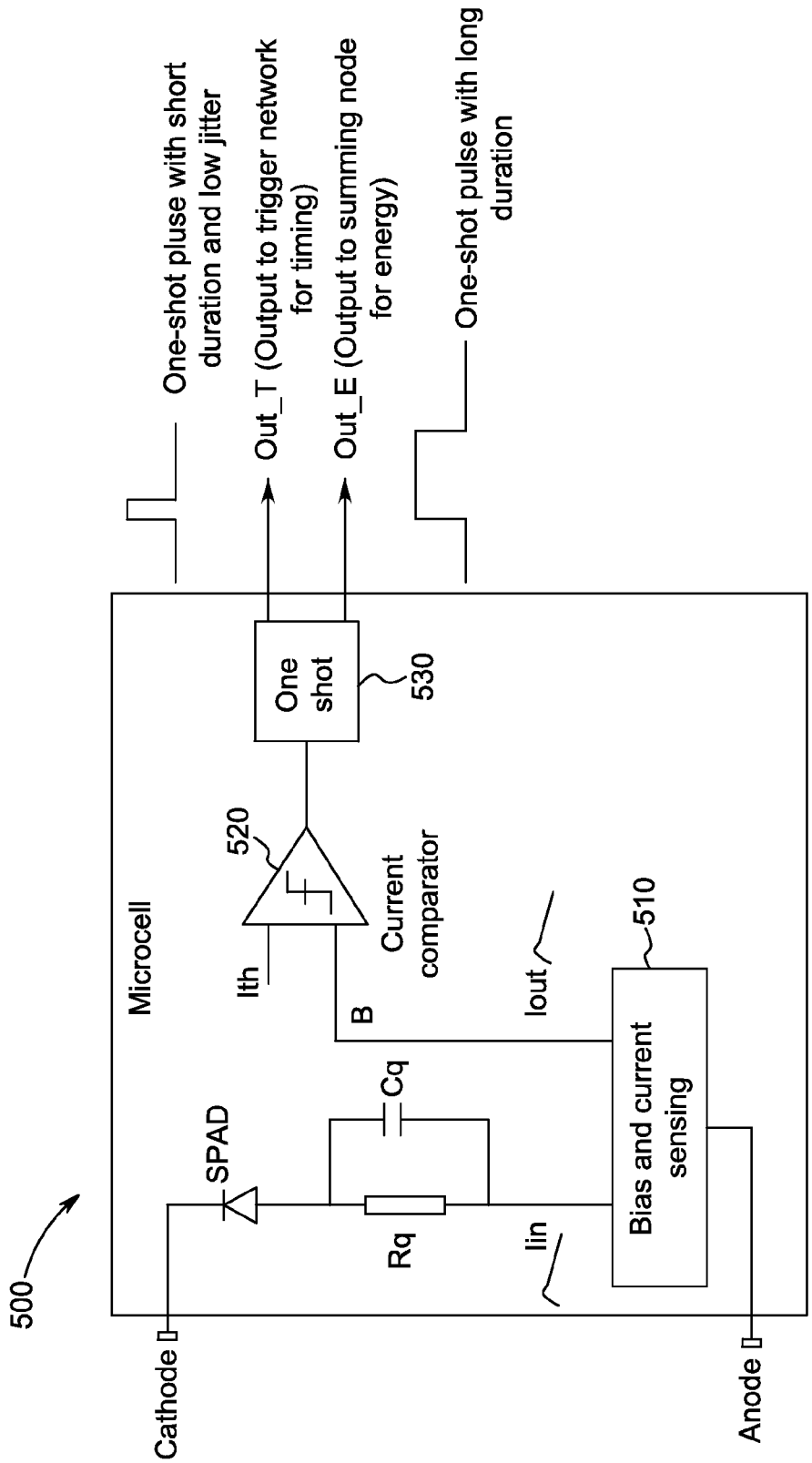
FIG. 5 depicts a microcell including integrated current sensing circuitry in accordance with some embodiments.

FIG. 5 depicts microcell 500 including integrated current sensing circuitry in accordance with some embodiments. As disclosed above, in some implementation the SPAD comparator can be operated in a current sense mode. Microcell 500 can be implemented as one microcell in an array of microcells, such as is depicted in FIG. 4. Microcell 500 can include current sensing and bias circuit 510. The current sensing and bias circuit provides bias to the SPAD, and senses current En when it flows through the SPAD. Output signal Iout from current sensing and bias circuit 510 is provided to current comparator 520, which compares this signal to predetermined current threshold Ith. Microcell 500 also includes one-shot circuit 530 which provides both a time output pulse Out_T and an energy output pulse Out_E, as described above.

Figure 6:
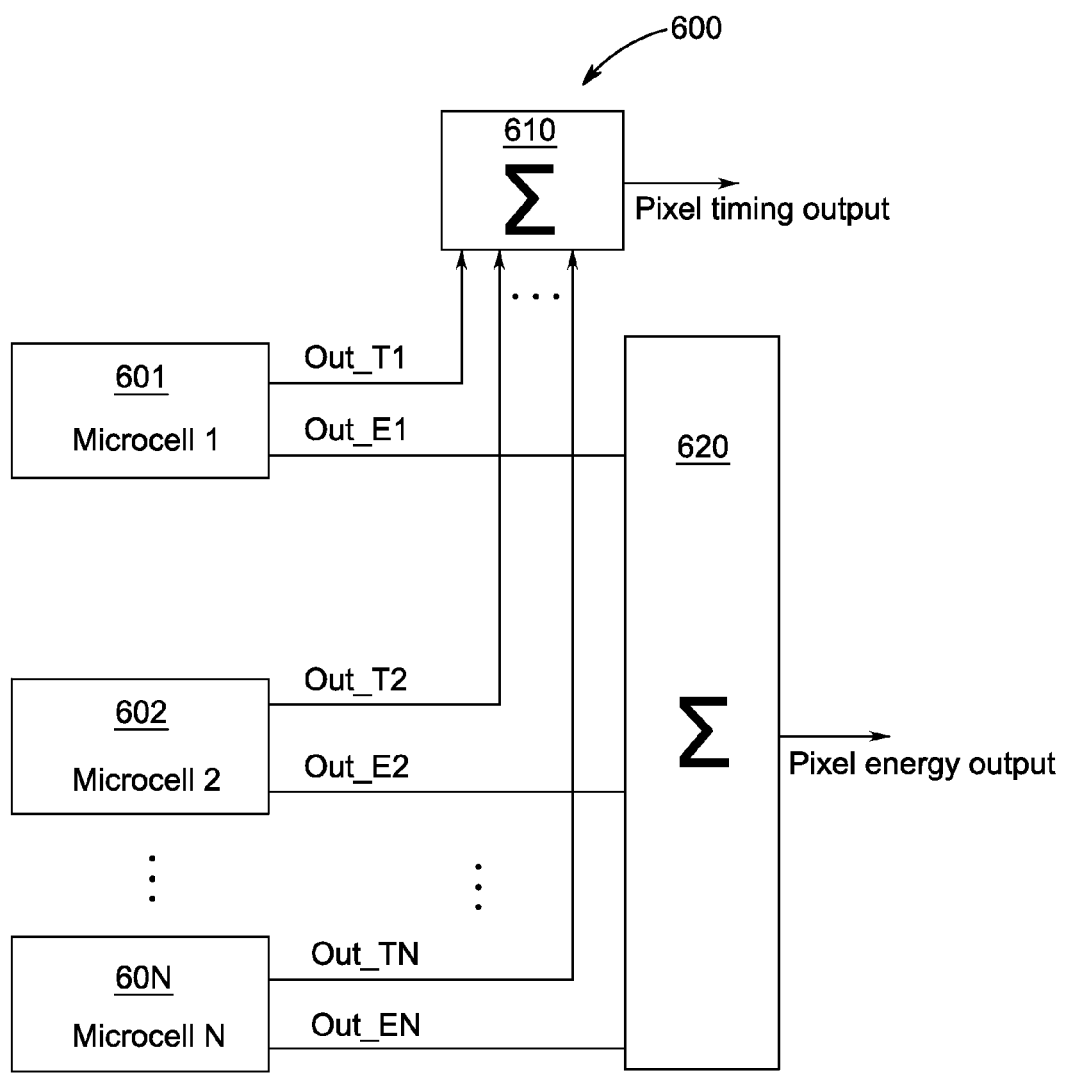
FIG. 6 depicts a network for analog summing of digital pulses from a microcell array in accordance with some embodiments.

FIG. 6 depicts pixel microcell array 600 including a network for analog summing of digital pulses from the microcell array in accordance with some embodiments. Microcell array 600 can include multiple microcells 601, 602, . . . , 60N. As disclosed above, each of the microcells can provide both a time output pulse Out_T and an energy output pulse Out_E. The microcells in pixel array 600, or any of the above-disclosed pixel arrays, can be in either voltage sensing mode or current sensing mode. In accordance with some implementations, some microcells can be sensed in voltage mode while others can be sensed in current mode.

In accordance with embodiments, microcell array 600 analog sums both digital output pulses Out_T and Out_E of the microcells. Summing node 610 can analog sum the time output pulses, and provide a pixel timing output to a TDC. Summing node 620 can analog sum the energy output pulses, and provide a pixel energy output to an ADC.

In accordance with embodiments, either and/ or both analog summers can be implemented as a summing node (e.g., wire summing) or as a summer component (e.g., integrated or discrete circuitry).

Embodying devices of SiPM with active sensing can have very fast SPE response for timing measurements, similar to the best vacuum PMT, stable gain and much smaller temperature sensitivity. The slow one-shot network is a perfect box-integrator with minimal pile-up effect and suppressed after-pulse contribution for energy measurements. The read out electronics are simplified and can achieve better energy and time resolution of nuclear detectors.

Although specific hardware and methods have been described herein, note that any number of other configurations may be provided in accordance with embodiments of the invention. Thus, while there have been shown, described, and pointed out fundamental novel features, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated.

The invention claimed is:

1. A silicon photomultiplier array comprising:
   a plurality of microcells fabricated on a semiconductor wafer, each microcell including a photon avalanche diode and an electronic circuit; and
   the electronic circuit configured to provide a first one-shot pulse and a second one-shot pulse based on a detected current flowing through the photon avalanche diode of each respective microcell.

2. The silicon photomultiplier array of claim 1, a duration of the first one-shot pulse controllable by an adjustable programmable value.

3. The silicon photomultiplier array of claim 2, the summation of the first one-shot pulses representing energy readout information from the silicon photomultiplier.

4. The silicon photomultiplier array of claim 1, the summation of the second one-shot pulses representing a timing measurement of an incident radiation exposure of the silicon photomultiplier.

5. The silicon photomultiplier array of claim 1, including:
   the plurality of microcells arranged in rows and columns;
   each microcell of a respective row connected to a respective row data bus;
   a row counter connected to each of the respective row data buses;
   the row counter configured to count one or more first one-shot pulses for a predetermined time period;
   a pixel adder connected to an output of the row counter, the pixel adder configured to sum the count of the one or more first one-shot pulses; and
   a digital-to-analog converter connected to an output of the pixel adder, the digital-to-analog converter configured to convert the pixel adder sum to an analog signal representative of an energy readout.

6. The silicon photomultiplier array of claim 5, wherein the row counter and the pixel adder are implemented as separate circuits.

7. The silicon photomultiplier array of claim 5, wherein the row counter and the pixel adder are implemented as one circuit.

8. The silicon photomultiplier array of claim 1, including:
   the plurality of microcells arranged in rows and columns, each microcell of a respective row connected to a respective row data bus;
   a row counter connected to each of the respective row data buses;
   a timing logic circuit configured to provide a validation signal to a counter control logic circuit; and
   the counter control logic circuit configured to provide one of a start signal, a stop signal, and a reset signal to the row counter.

9. The silicon photomultiplier array of claim 8, the counter control logic circuit configured to monitor an output of the row counter, to compare the row counter output to a predetermined threshold in digital code, and to reset the row counter if the validation signal is not present.

10. The silicon photomultiplier array of claim 9, the counter control logic circuit configured to reset the row counter after a predetermined integration time period if the validation signal is present.

11. The silicon photomultiplier array of claim 8, including:
    an OR gate in the counter control logic circuit, the OR gate configured to operate on the validation signal and a periodic reset signal; and
    the counter control logic circuit configured to provide a reset signal to the row counter based on the OR gate operation.

12. The silicon photomultiplier array of claim 11, including the periodic reset signal having a predetermined time period.

13. The silicon photomultiplier array of claim 8, including band pass filters in an integrated digital accumulator, the band pass filters configured to eliminate a slow drift in energy readout.

14. The silicon photomultiplier array of claim 1, including a comparator configured to detect the current flowing through the photon avalanche diode.

15. The silicon photomultiplier array of claim 14, the comparator configured to operate in one of a current sense mode and a voltage sense mode.

16. The silicon photomultiplier array of claim 1, including a summer configured to sum each of the first one-shot pulses from respective microcells, the summer configured to provide an analog signal representative of a pixel energy output.

17. The silicon photomultiplier array of claim 1, including a trigger network configured to sum each of the second one-shot pulses from respective microcells, and to provide a digital signal representative of a pixel timing output.

18. The silicon photomultiplier array of claim 17, the trigger network including a summing node connected to the respective microcells.

19. The silicon photomultiplier array of claim 14, including:
    the comparator configured to operate in a current sense mode; and
    each microcell including a current sensing and bias circuit configured to provide a bias to the photon avalanche diode, and to sense a current flowing through the photon avalanche diode.

20. The silicon photomultiplier array of claim 19, including current sensing and bias circuit configured to provide a current signal to an input of the comparator.

* * * * *